Patented Nov. 6, 1928.

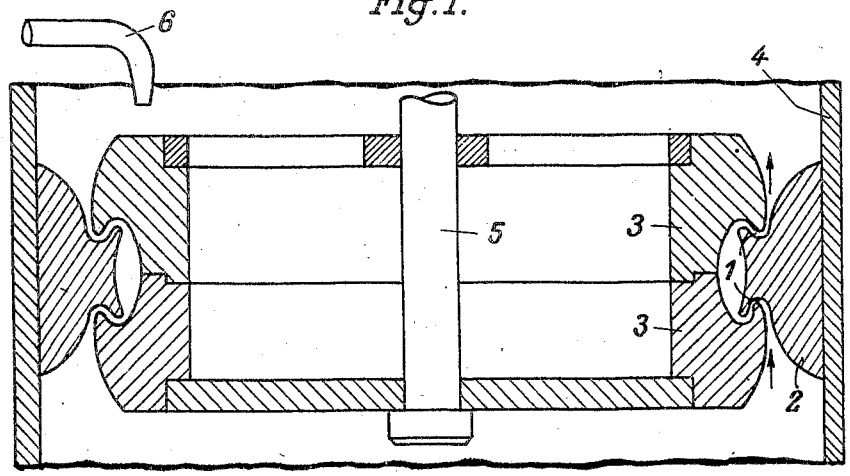
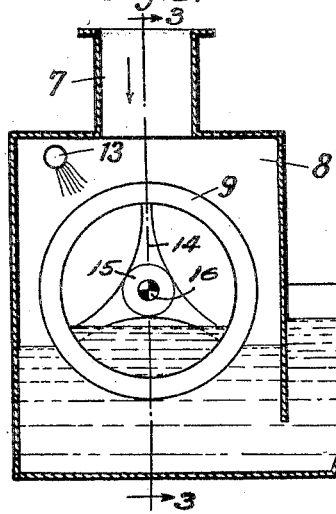
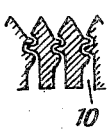
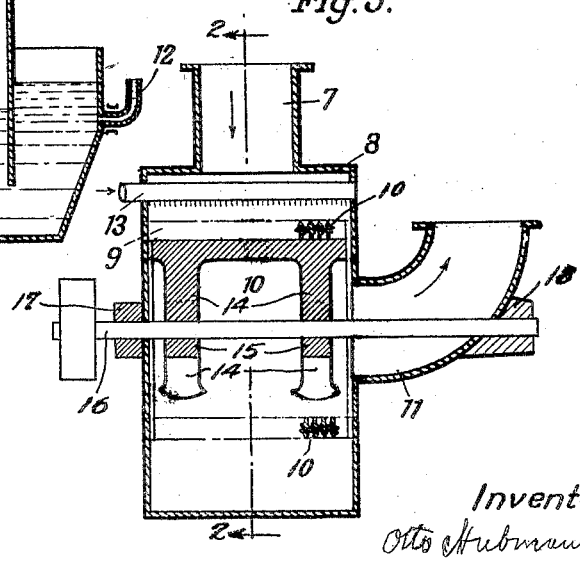

1,690,635

UNITED STATES PATENT OFFICE.

OTTO HUBMANN, OF FRANKFORT-ON-THE-MAIN, GERMANY, ASSIGNOR TO METALL-BANK & METALLURGISCHE GESELLSCHAFT AKTIENGESELLSCHAFT, OF FRANKFORT-ON-THE-MAIN, GERMANY, A CORPORATION OF GERMANY.

APPARATUS FOR CLEANSING AND COOLING GASES.

Application filed November 3, 1926, Serial No. 147,147, and in Germany August 8, 1925.

The present invention relates to an apparatus for cleansing and cooling gases, and particularly to apparatus for separating from gases solid or liquid particles suspanded therein by contacting a liquid therewith.

In the treatment of gases with liquids whether for cleansing, cooling, or similar purposes, it is essential that the contact between the gas and liquid be as intimate as possible. Prior to my invention, the methods ordinarily used for producing this effect involved spraying the liquid into a chamber filled with the gas, or passing the liquid and gas simultaneously through a chamber filled with coke or other coarse granular material or provided with a system of baffle plates or the use of centrifugal washers. These methods, while sufficient in some respects, are not entirely satisfactory. The apparatus required is usually bulky and of expensive construction. In addition, the passage of the gas through contacting apparatus of the type referred to entails a considerable drop in pressure, and consequently the use of a number of pumps which considerably increases the operating cost.

The provision of apparatus for cleansing and cooling gases which will not be subject to the defects which characterize those used heretofore, is the principle object of the present invention.

According to this invention a thorough cleansing or cooling of gases is secured by passing the gases at an increased velocity through narrow passageways, the walls of which are kept suitably moistened, as for instance by passing a stream of the treating liquid thereover, and within which the gas stream is deflected as sharply as possible at the narrowest point.

By reason of this sharp change of direction at a high velocity, suspended particles such as dust and mist are thrown against the walls of the passageways after which they are quickly taken up and carried away by the cleansing liquid. This separation of the suspended particles is due to the action of centrifugal force, and it follows that the separating effect may be intensified to the maximum by making as small as possible the radius of curvature of the deflections. The above construction also results in a highly effective contacting of the gases with the treating liquids on account of whirls formed within the passageways, and because the drops of the washing liquid are carried along by the gas stream.

In the preferred form of the invention, the gas stream before entering the narrow passageway is subjected to a gradual decrease in its cross sectional area thus increasing its velocity until it is traveling at the desired velocity as it enters the narrow passageway. In general, the effectiveness of the apparatus is increased by increasing the velocity of the gas through the narrow passageway. However, the maximum velocity attainable in practice will vary with specific conditions such as the amount and character of the gas treated, the type of apparatus used and the like. For efficient operation the gas velocity through the narrow passageway should exceed 40m./sec. This relatively high velocity may be imparted to the gas stream by passing it into the narrow passageway through a converging inlet. Practically no energy is lost by this change in velocity, the gas stream merely being changed from one having a low velocity and large cross sectional area to a stream of high velocity and of a correspondingly smaller cross sectional area. After passing through the narrow circuitous passageway, the gas stream is restored to its original velocity and pressure, except for frictional losses by gradually increasing its cross sectional area, which may be accomplished by withdrawing the gas stream through a gradually diverging outlet. This outlet also serves as a convenient means for introducing the wash liquid into the passageway. It is possible that the excellent scrubbing action of the arrangement may be attributed in part to a separation of any particles remaining in the gas after its transfer through the narrow passageway in this diverging outlet as the gas stream is being restored to its initial velocity.

In the treatment of gases, according to my invention, it is preferable to complete the operation as far as possible in a single passageway because the maximum result from the power used in overcoming frictional loss within the passageway is thereby attained, since the effectiveness of the device, which will hereinafter be referred to as the contacting unit, is directly proportional to the square of the gas velocity and inversely proportional to the radius of curvature of the deflection. That is to say, the greatest cleansing effect per unit of power consumption is in general obtainable by the use of a single passageway. In some instances it may be advisable to arrange a number of these contacting units in series, or in other arrangements which will be described in detail in connection with the drawings.

In case the gas treated contains liquid suspensions such as tar mists, the introduction of a liquid into the passageway from some external source will usually be unnecessary as the liquid particles initially deposited within the passageway will serve as a wash-liquid to remove those subsequently deposited.

If the gases treated contain suspensions, which tend to form firmly adhering encrustations upon the walls of the narrow passageway, special precautions must be taken to remove them before stoppage of the gas passageway occurs. This may be done by forcing a large volume of wash-liquid, either intermittently or continuously through the passageway, or by arranging the contacting units in interchangeable groups which may be removed and cleansed without interrupting the process. The special forms of apparatus which have been designed to accomplish these functions possess a number of other additional advantages and comprise a part of my invention.

According to one of these arrangements the contacting units, each of which comprises one of the narrow circuitous gas passageways, are arranged on a rotatable support and a uniform supply of the wash liquid through the passageways is thus maintained regardless of where it may be introduced. A similar even distribution of the wash liquid may be secured by a relative movement of the elements defining the gas passageway, or by a relative movement of the walls of the passageway with respect to the wash liquid.

The separation of liquid suspensions such as tar mists from gases containing water vapour by washing with tar alone presents special difficulties because of the danger of adherence to the wall of the passage and because of the high temperatures at which the gas must be treated. The treatment of such gases with cold water might be sufficient, however, in some instances, due to the tendency of tar to form emulsions with water which are difficult to break down, it has been found more advantageous to complete the separation of the tar mists in a process comprising two stages. In the first of these, the gas is given a preliminary scrubbing treatment at a temperature over its dew point. The preliminary scrubbing may be effected in an apparatus comprising any suitable one of the various modifications of my invention, and if necessary tar may be used as a wash liquid. The partially cleansed gas is then cooled and passed through a second scrubber where the cleansing operation is completed by washing with water. The second scrubber also comprises one of the various devices in which my invention may be embodied, and a different modification may be adopted than that used in the preliminary scrubber, if desired. The partially cleansed gases are preferably cooled by contacting them with the wash liquid from the second scrubber, as this is not only a convenient source of cooling liquid, but the heat absorbed by the wash liquid is usually sufficient to break up any tar emulsions formed therein.

From the foregoing it will be apparent that my invention is one of wide applicability, and one that may be embodied in a variety of structures and for a number of different purposes. As illustrative of the scope and advantages of the invention, a number of modifications of the invention will be described hereinafter, in connection with the accompanying drawings in which Fig. 1 is a vertical sectional view of one form of the invention.

Figs. 2 and 3 are sectional views of another form of the invention in which the contacting units are arranged in the form of a revolvable cylinder, Fig. 2 being taken along the line 2—2 of Fig. 3, and Fig. 3 being taken along the line 3—3 of Fig. 2;

Fig. 4 is a detail of the construction of the contacting units used in the apparatus illustrated in Figs. 2 and 3.

Fig. 1 illustrates a simple form of apparatus embodying my invention, in which the inlet and outlet openings to the restricted contacting passageway are circular in outline. This apparatus comprises a cylindrical frame or casing 4 having a band 2 secured to its inner periphery. A plate 3 is rotatably supported in the center of the casing 3 by the axle 5. The edge of the plate 3 and the inner periphery of the band 2 are formed so as to provide two of the contacting units in a series relationship, each of the units comprising a narrow circuitous passageway designed to effect a rapid change in the direction of flowing the gas stream therethrough, and having a gradually converging inlet and diverging outlet. Washing liquid is supplied to the device from any convenient source such as the pipe 6. The gas treated may be introduced either from the top or bottom; but for cooling or adsorbing purposes countercurrent flow is more effective, and it also assists in the even distribution of the wash liquid. Rotation of the plate 3 serves to distribute the wash liquid throughout the narrow contacting passageway, and effects a uniform rinsing of the entire passageway.

In the device shown in Figs. 2–4 inclusive, the contacting units are arranged in the form of a cylinder 9. The individual contacting units are formed by the rings or washers 10, the construction of these being illustrated in detail by Fig. 4. The cylinder 9 comprises a number of these rings suitably secured together and arranged as shown in a spaced relationship so as to form a number of parallel contracting units, and is revolvably mounted in the casing 8 on the horizontal axis 16. (The axis 16 is supported by bearings 17 and 18, and the cylinder 9 is connected with axis 16, by means of the spider 14 and the hubs 15.) This cylinder 9 may be made up of a plurality of separate and interchangeable parts to facilitate cleaning or repairing operation. The lower portion of the contacting cylinder is immersed in a body of the washing liquid, the level of which may be varied by rotating pipe 12. Wash liquid is supplied to the cylinder 9 at the rate required through the conduit 13, while the gas is introduced through the next 7 into the upper portion of the casing 8, from where it passes through the contacting units into the interior of the cylinder 9, and then exits from the apparatus through the outlet pipe 11. The aggregate cross sectional area of the gas passageways may be varied by changing the level of this wash liquid, by rotating the overflow pipe 12, and it is thus possible to impart a high velocity to the gas introduced into the contracting passageway regardless of whether the volumes of gas treated are large or small. The total or aggregate cross sectional area may also be increased or decreased by increasing or decreasing the rate of rotation of the cylinder 9 through the wash liquid, since the larger volume of wash water carried along at the higher speeds tends to further restrict the narrow passageways.

This particular form of my invention, in which the contacting units are arranged in the form of a cylinder and dipped at intervals in the washing liquid, is particularly well adapted to the treatment of gases tending to form encrustations on the walls of the contacting units. The large volume of water forced through the narrow passageways during the period of immersion will remove any deposited matter, and this effect may be increased by increasing the rate of rotation of the cylinder.

From the foregoing it will be evident that my invention provides an effective apparatus for the washing and cooling of gases and one which requires far less space than the washing towers and similar devices used heretofore. The energy required to operate the coolers and scrubbers embodying my invention in passing the gas therethrough, rotating the contacting units, etc., has been found to be much less than that required to operate the ordinary forms of centrifugal washers.

I claim:

1. In combination, in an apparatus for separating from gases particles suspended therein, a chamber, a gas and liquid contacting means disposed within said chamber, said means including a cylindrical member revolvable about its axis, the walls of said cylinder having a plurality of narrow passageways adapted to the passage of fluids provided therein, each of said pasageways having a converging fluid inlet and a diverging fluid discharge opening, and means for introducing a gas and liquid into the chamber and simultaneously through the passageways, the walls of said chamber cooperating with said cylinder to prevent the gases from traversing said chamber except through the narrow pasageways in the walls of said cylinder.

2. In combination, in an apparatus for separating from gases particles suspended therein, a chamber, a gas and liquid contacting means disposed within said chamber, said means including a cylindrical member revolvable about its axis, the walls of said cylinder having a plurality of narrow passageways adapted to the passage of fluids provided therein, each of said passageways having a converging fluid inlet and a diverging fluid discharge opening, means for introducing a gas and liquid into the chamber and simultaneously through the passageways, and means for regulating the flow of the liquid through said pasageways, the walls of said chamber cooperating with said cylinder to prevent the gases from traversing said chamber except through the narrow passageways in the walls of said cylinder.

3. In combination, in an apparatus for separating from gases particles suspended therein, a chamber, a gas and liquid contacting means disposed within said chamber, said means including a cylindrical member revolvable about its axis, the walls of said cylinder having a plurality of narrow passageways adapted to the passage of fluids provided therein, each of said passageways having a converging fluid inlet and a diverging fluid discharge opening, means for introducing a gas and liquid into the chamber and simultaneously through the passageways, and means for closing part of said passageways, the walls of said chamber cooperating with said cylinder to prevent the gases from traversing said chamber except through the narrow passageways in the walls of said cylinder.

In testimony whereof, I affix my signature.

OTTO HUBMANN.